United States Patent [19]

Sheu

[11] Patent Number: 4,667,064

[45] Date of Patent: May 19, 1987

[54] CABLE CONNECTOR STRUCTURE

[76] Inventor: Chin-Chang Sheu, No. 1, Lane 64, Hsi-Men Street, Hsin-Chu City, Taiwan

[21] Appl. No.: 807,241

[22] Filed: Dec. 10, 1985

[51] Int. Cl.[4] .................. H02G 15/02; H02G 15/08; H01R 4/00

[52] U.S. Cl. ............... 174/84 R; 174/74 R; 339/116 C

[58] Field of Search ............... 174/74 R, 84 R, 88 C; 339/116

[56] References Cited

U.S. PATENT DOCUMENTS

| 2,753,392 | 7/1956 | Hebeler | 174/84 R |
| 3,859,455 | 1/1975 | Gommans et al. | 174/88 C |
| 4,144,404 | 3/1979 | De Groef et al. | 174/88 C |
| 4,595,724 | 6/1986 | Koblitz | 174/84 R |

FOREIGN PATENT DOCUMENTS

| 908271 | 4/1954 | Fed. Rep. of Germany | 174/74 R |
| 399381 | 10/1942 | Italy | 174/74 R |
| 959512 | 6/1964 | United Kingdom | 174/74 R |
| 2105119 | 3/1983 | United Kingdom | 174/84 R |

Primary Examiner—E. Michael Combs
Attorney, Agent, or Firm—Browdy and Neimark

[57] ABSTRACT

The present disclosure relates to a novel structure of a cable connector, and more particularly to a connector with advantage of saving practicing time, material and cost; in practice of the present disclosure, several layers of glass fiber band are wrapped around the front portion of the cable covered with PE plastics, then, a number of layers of PE band are circled around the cable at the position properly distanced behind the glass fiber band, and followed by a step of using a lead plate, having a plurality of small bores at its rear section, to cover the banded cable, forming a so-called auxiliary lead tube having a cross sectional shape " ⌐_ ", the bended front part of said tube is welded to a steel band around the cable, and the rear portion of the tube is heated to make wrapped PE plastic band melt and stuff in those said bores, and use PE glue tape and VN glue tape consecutively to tangle around the rear portion of the tube and cable forming a tightly closed joining base; an extension lead collect with a plurality of detents is secured thereto by welding to facilitate the connecting practice.

4 Claims, 17 Drawing Figures

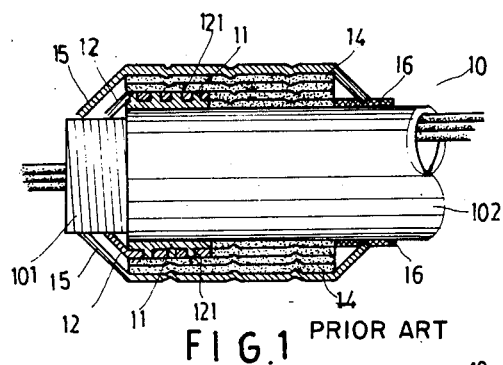
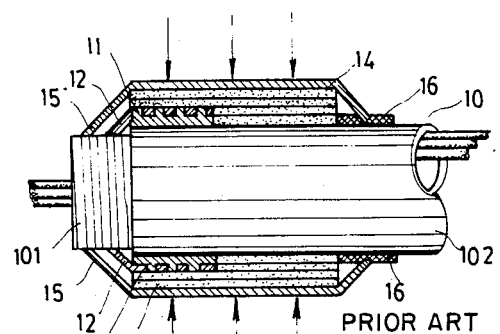
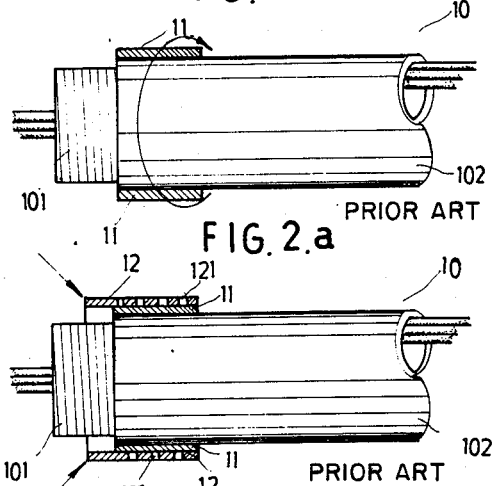
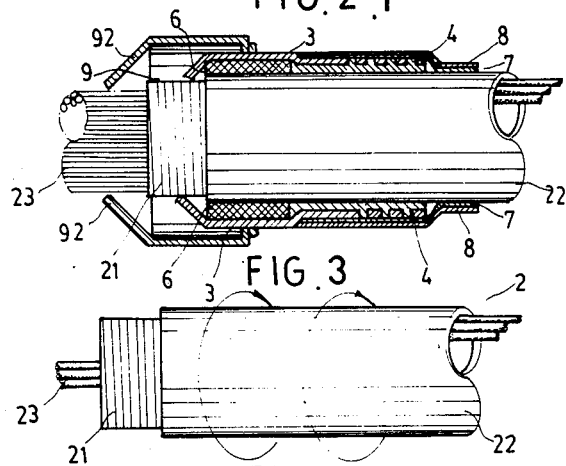
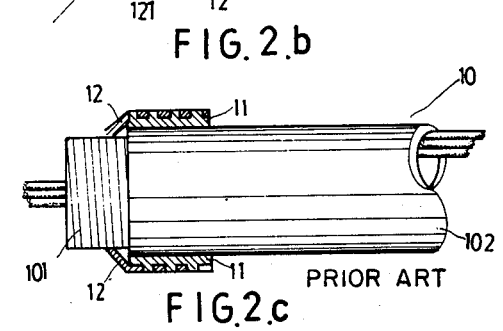
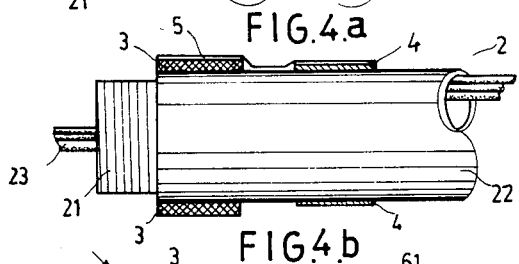
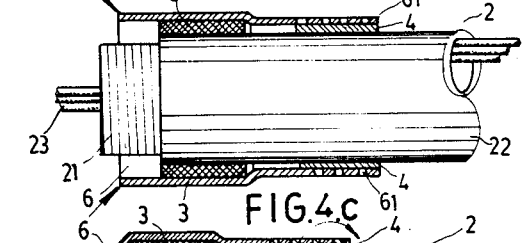
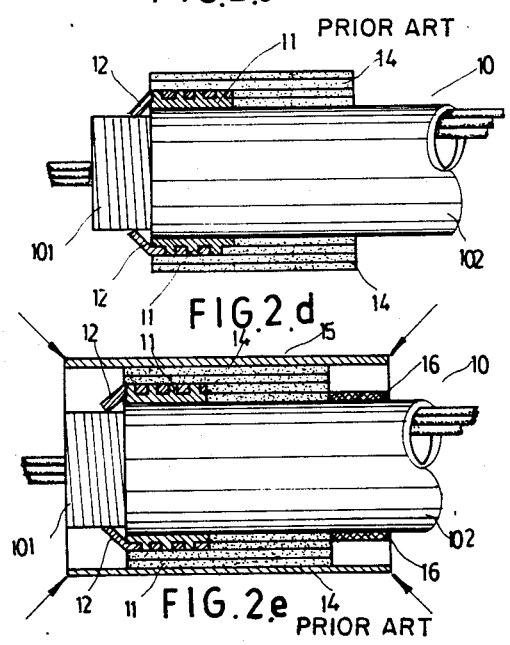
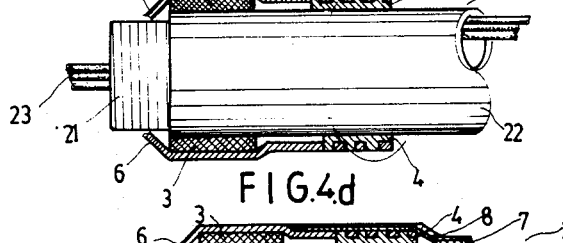
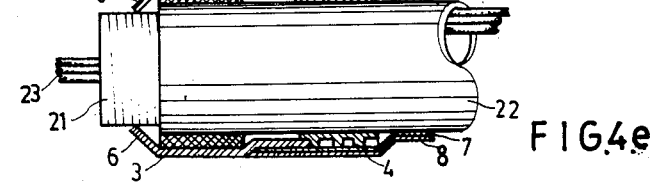

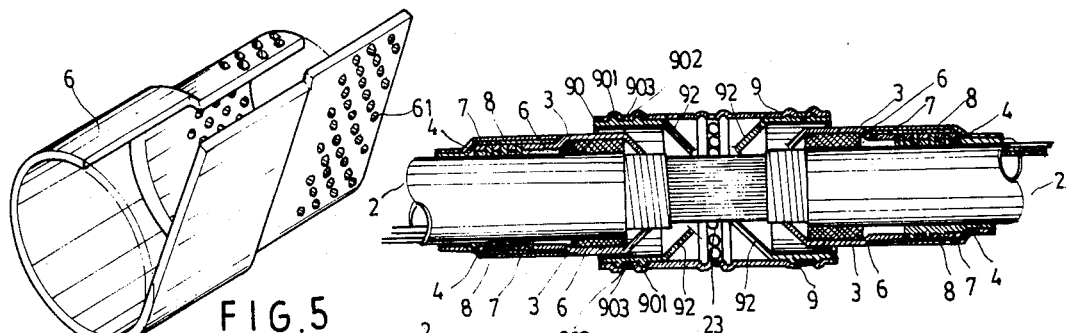
FIG.5  FIG.7
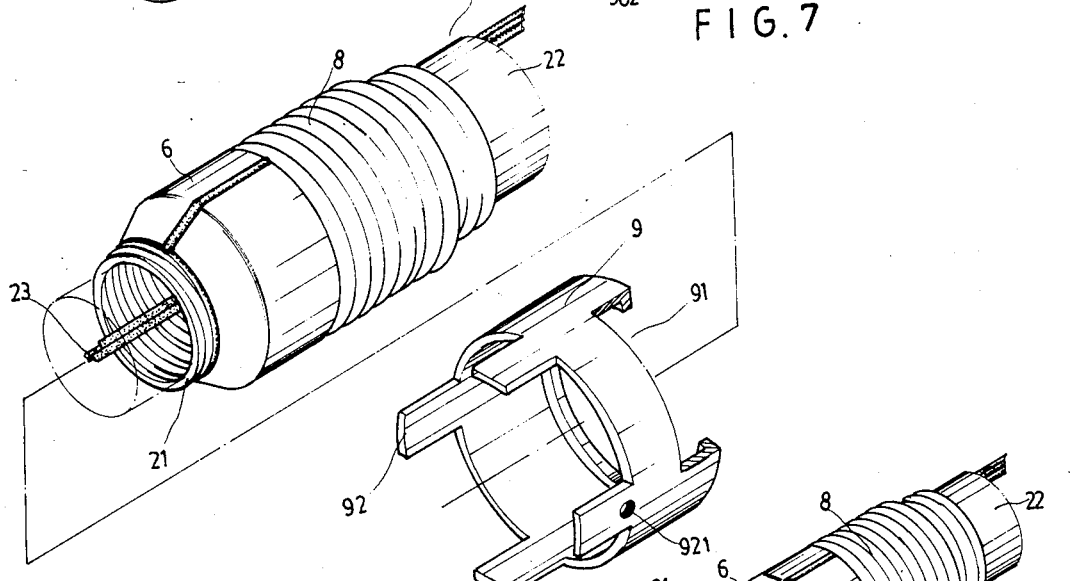
FIG.6
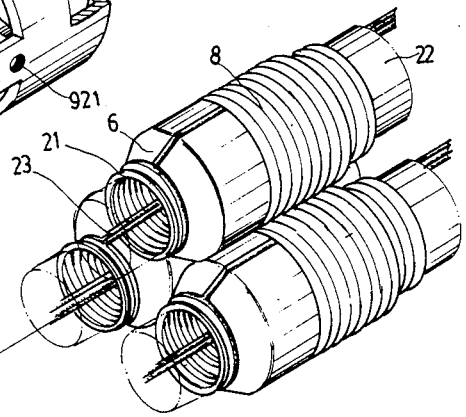
FIG.8
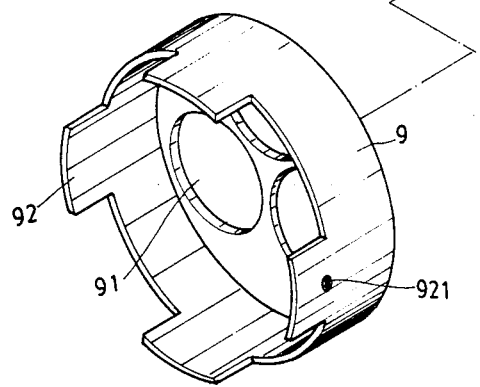

CABLE CONNECTOR STRUCTURE

SUMMARY OF THE INVENTION

The present invention provides a very practical new structure for a cable connector, which takes advantage of glass fiber band, PE band, aluminum coated glue tape, an auxiliary lead tube, PE glue tape, VN glue tape and an extension lead collect as wrapping material so to form a small-size, quick-to-dissamble connector structure for cable joining.

Communications between people are enhanced along with the world civilization advances. Telephones play a very important role in modern world, and have advantages of quickness and handiness. It is estimated that 95% of families, corporations or firms in a modern society are equipped with phones, the readiest way of communication.

The communication cable has transformed from one channel of sending message to multiple channels technique with improved capacity of maintaining signal quality. No matter what method of constructing cable line is taken, cable connectings are unavoidable. In order to maintain good quality of transmission of messages as well as its original tension at the connecting position, it is necessary to keep the connector from water, damage and gas.

As shown in FIG. 1, in the conventional method of joining cables, using a cable wrapped with PE plastics as well as aluminum and steel band as example, the first step required is to remove the attached asphalt around the steel band 101 at the cut 10 of said cable, then cover the plastic tube 102 of PE material with 6-8 layers of PE belts 11 as shown in FIG. 2a at the front of said tube, and on the PE belt 11 wrapped with a lead plate 12 having a plurality of bores 121 thereon. For sealing purpose, a glue tape 13 with aluminum coating is enclosed around the PE belt 11 at the sealing end, and sealed with the said lead tube 12 as shown in FIG. 2b; the lead tube formed by said lead plate 12 must be hammered at the front so to closely attach the front portion to said steel belt 101 around the cable, and then welded the said lead tube peripherally to said tube, and the lead tube is heated at those bores for melting P.E belt 11 into said bores 121 (as shown in FIG. 2c). The cable 10 is once again enclosed with sealing tape 14, so is the fixed lead tube 12, and also enclosed with 3-5 layers of glass fiber band 16 at the other end, opposite to end with lead tube (as shown in FIG. 2e). After above procedures achieved, a lead tube 15 is used for housing said properly tape-wrapped cable, and both ends of the lead tube are hammered peripherally abutting the steel band 101 on one end and the glass-fiber band 16 on the other for welding so to seal the joined cable as shown in FIG. 2f, at the moment, clamping device is disposed around the outer surface of the lead tube forming a plurality of ditches on the surface, to keep PE band 11, lead tube 12 with small bores, glue tape 14, lead tube 15, glass fiber band 16 and cable 10 as a unity, so to finish the whole joining procedures.

It becomes apparent that the conventional practice needs more than twenty steps of wrapping, hammering, welding and clamping, and takes more than twenty minutes for a skilled worker to accomplish one job, it is a time-consuming and labor-wasting way.

Another drawback of conventional practice is to use too much material, as PE band, lead tubes, glue tapes producing a joint of large diameter, volume, and much weight, and naturally leading to a waste of material.

Too much hammering, taping and welding in the assembly procedures result in difficulty in disassembling the joint, thus make the recycling use of the joint troublesome.

To keep the joint waterproof, damage-free and air insulating, a numer of lead tubes are used to wrap around the cable by hammering and welding for better sealing effect, thus increases the diameter as well as volume of the joint, and has a bad effect on the tension of the cable, and makes the disassembly difficult.

The primary object of the present disclosure is to provide a new connector structure which uses glass fiber band, PE band, auxiliary lead tube, PE glue tape, VN glue tape and the extension lead collect to seal and wrap the joint of the cable with the merits of simplicity, practicality and economy in both cost and time.

The second object of the present disclosure is to provide a new and simple cable connector structure which has smaller diameter and volume, and less weight than conventional one, resulting in saving structure material as well as cost.

The third object of the present disclosure is to provide a connector structure easy to assemble and dissamble in practice, and the connector can be better recycled for use than conventional one.

The fourth object of the present disclosure is to provide a connector which is waterproof, damage-free and air-insulating.

The fifth object of the present disclosure is to provide a connector which can be grounded by simply using a screw located in a screw hole on the extension lead collect.

DESCRIPTION OF DRAWINGS

The features, structure and function of the disclosure are further detailed with the accompaning drawings:

FIG. 1 is a sectional view of a conventional structure for joining cables;

FIG. 2a to FIG. 2f are sectional views of each stage of operation in conventional practice;

FIG. 3 is a sectional view of a novel structure of the present disclosure;

FIG. 4a-4e are sectional views of each stage of operation in present practice;

FIG. 5 is the perspective view of the auxiliary lead tube of the present disclosure;

FIG. 6 is a perspective illustration of both the joining base and an extention lead collect of the present disclosure;

FIG. 7 is a perspective view of the first kind of application of the present disclosure;

FIG. 8 is a perspective view of the second kind of application of the present disclosure.

DETAILED DESCRIPTION

Referring to FIG. 3 and FIG. 4, the present disclosure is adapted for joining cables together and comprises component materials of glass fiber band 3, PE band 4, aluminum coated glue tape 5, auxiliary lead tube 6, VN glue tape 7, PE glue tape 8 and extension lead collect or holder 9. Before joining, the end 2 of cut cable to joined is removed of its plastic surface and cleaned for exposing inside steel band 21 (as shown in FIG. 4a), 8-10 layers of glass fiber band 3 are wrapped at the front portion covered with PE plastic surface, and just next to the said steel band 21, 8-10 layers of PE band 4 are wrapped properly distanced from the said glass fiber band 3, and a strip of aluminum coated tape 5 is disposed upon both the said bands 3 and 4 axially as shown in FIG. 4b for welding two sides of a wrapped lead plate together securely to said cable as shown in FIG. 4c forming a closed tube 6 having a plurality of bores 61 at it rear portion, and having a "⌣" shaped axially cut section as shown in FIG. 5.

The auxiliary lead tube 6 determined by the diameter of the wrapped cable can avoid waste of material, and the cable is prevented from being damaged by heat from welding by said strip of aluminum coated tape. The front of said lead tube 6 is hammered peripherally so to attach to steel band 21 as one, and the rear bores 61 are stuffed with melting PE plastics from PE band 4 for tightly securing the lead tube 6 to said cable 2 as shown in FIG. 4d; VN glue tape 7 is wrapped around the rear portion of said lead tube 6 and part of joined cable 2 (as shown in FIG. 4d), covering those said bores as well as the fissures between the lead tube 6 and the cable 2, and on the VN tape 7 wrapped another PE glue tape 8 for further sealing and providing a solid joining structure as well as a cable joining base as shown in FIG. 4e.

Referring to FIG. 6, a so-called extension lead collect 9 is a cylindrical hollow case having an annular opeinig 91 at one end and a plurality of so-called detents 92 at the other end for grasping cable core 23 after they are bended, and the said joining base is inserted in the annular opening of said collect 9 and secures the head 9 to said lead tube 6 at the middle by welding peripherally around the opening 91 so to form a solid new cable joint. Besides, the cable can be easily grounded by simply fixing a screw of grounding to screw hole 921 on one of said detents 92, the whole procedure takes approximately 10 minutes to finish acquiring a connector of small diameter, less volume and less weight so to facilitate the cable joining and promote the efficiency of the related work.

Referring to FIG. 7 showing a practical application of the present disclosure, cut cables are joined by said techniques of present disclosure acquiring a joint of small diameter and less volume; the inside cable cores are coupled together, followed by a step of enclosing the joined cable with another lead sealing tube 90 having both its ends welded securely to the right and left extension lead collects attaining the object of tightly sealing the joint with features of being waterproof, damage-free and air-insulating, and the present structure can improve the efficiency of joining cables by saving the pains of hammering and welding, besides, it also becomes possible to dissable the joined cable easily only by removing the welding spots.

The outer surface of the lead sealing tube 90 consists of serveral peripherally protruded paired contours 901, and a plurality of air outlets perforations 902 are disposed therebetween for letting hot air produced in welding escape therethrough; those perforations 902 are then stuffed with insulation glue 903, so to reduce the weight of the joint as well as enforce the strength of it.

Furthermore, the cable connector can better illustrate its practicality and improved effect when applied to a plurality of cables at one time, referring to FIG. 8, three cables are joined in the example, the previously described procedures are taken to form individual joining bases as said before, and said extension lead collect having three openings for receiving three to-be-joined cables therethrough is applied to the joint, and said collect is welded peripherally to each joining base of said cable with detents of said collect gripping cores of the three cables, and the three joints are disposed in a so-called outer sealing lead tube and enveloped therein by welding both ends thereof to make the joint waterproof, damage-free and air-insulating, and the cables can be disassembled by removing all those welding spots smoothly without damage. It is obvious that the improved cable connector not only facilitates the practice of cable joining but also expediates the disassembly of the joint.

By summing up all the above description and comparison, it is known that the cables are joined by using glass fiber band, PE band, aluminum coated glue band, auxiliary lead tube, VN glue tape, PE glue tape and extension lead collect which are combined together by tangling to each other or welding to easily form a joint of small diameter, less volume and light weight and having the features of being waterproof, damage-free and air-insulating, and particularly efficient when applied to multi-cable joining practice by its uniquely designed auxiliary extension lead collect so to avoid all the time consuming, troublesome and material-wasting procedures taken in conventional connector.

I claim:

1. A cable connecting structure comprising:
   a cut cable with its outer surface covered with a PE plastic tub and a front portion exposing an interior steel band;
   6–8 layers of glass fiber band wrapped around the front portion of said cable covered with PE plastics;
   6–8 layers of PE band wrapped around a rear portion of said cable covered with PE plastics;
   aluminum coated glue tape adhered to surfaces of said glass fiber band as well as said PE band at selected longitudinal positions;
   an auxiliary lead tube having its longitudinal section shaped in "⌣" form and a plurality of orderly arranged small bores at a rear portion for enveloping said cable already covered with said glass fiber band as well as said PE band, said lead tube being formed of a longitudinally welded wrapped lead plate with a front portion thereof welded to said steel band of said cable and a rear portion firmly adhered to the cable by melted portions of said PE band which fill said bores;
   VN glue tape wrapped around said rear portion of said auxiliary lead tube to keep all of said bores as well as any fissures between the cable and said lead tube well sealed;
   PE glue tape wrapped over said VN glue tape forming a connecting base;
   an extension lead holder having a hollow case with a cable receiving hole at a rear end and a plurality of protruding detents at a front end thereof;
   wherein said extension lead holder is welded peripherally at said front end, to a joining base, with said detents having an angled shape to contact and grip a cable core.

2. A cable connecting structure as claimed in claim 1 wherein one of said protruding detents of said extension lead holder has a screw hole for receiving a grounding screw.

3. A cable connecting structure as claimed in claim 1 wherein said extension lead holder is provided with a plurality of said cable receiving holes at said rear end for connecting multiple cables.

4. A cable connecting structure as claimed in claim 1 further comprising a sealing lead tube wrapped around part of two said auxiliary lead tubes, said sealing lead tube being welded at both ends to said two auxiliary lead tubes after cores of said cables are joined; wherein said sealing lead tube has a plurality of paired annular protrusions on its outer surface and a plurality of vents disposed therebetween for permitting hot air produced during welding to escape therefrom, said vents being filled with insulating glue for tight sealing.

* * * * *